July 21, 1953    E. A. RICE    2,646,021
FISH BOWL AND HOLLOW HANDLE ASSEMBLY
Filed Feb. 21, 1951
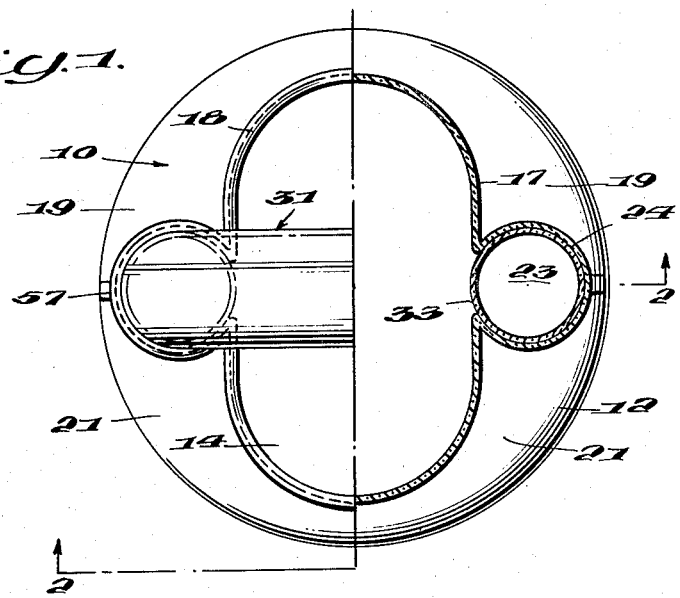
Fig. 1.
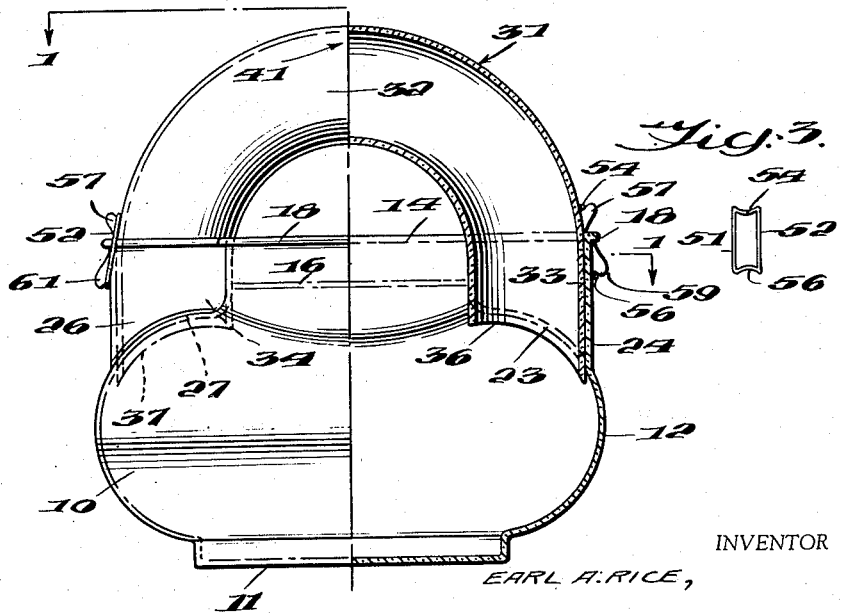
Fig. 2.
Fig. 3.
INVENTOR
EARL A. RICE,
BY George P. Dant
ATTORNEY Patented July 21, 1953

2,646,021

UNITED STATES PATENT OFFICE 2,646,021

FISH BOWL AND HOLLOW HANDLE ASSEMBLY

Earl A. Rice, Mercersburg, Pa.

Application February 21, 1951, Serial No. 212,064

3 Claims. (Cl. 119—5)

The present invention relates to an aquarium formed of transparent material and provided with a hollow tubular transparent handle which may be filled with water to provide a pass-over tube for the fish. The invention more particularly pertains to the structural features of the bowl and the handle so that the device may be formed of two parts to reduce the manufacturing costs.

It is known to provide a tubular handle for a fish bowl wherein the arched tube is integral with the bowl structure and in open communication with diagrammatically opposite portions of the bowl. An aquarium of this type is disclosed in the Rice Patent 2,512,678, dated June 27, 1950. An aquarium of the type disclosed in said patent presents manufacturing difficulties particularly when the bowl and handle are to be formed of glass.

It is accordingly an object of the present invention to provide an aquarium receptacle and separate tubular handle so that the bowl may be formed in simple manner and the handle manufactured as a separate element and thereafter conveniently fitted into sockets in the bowl and retained therein so as to form a handle and fish pass-over tube for the bowl.

A more specific object of the invention is to provide sockets in the upper portion of the bowl structure for receiving substantially straight depending legs of the hollow tubular handle so that the lower open ends of the handle will be positioned below the normal water level in the bowl and to thereby provide a structure for supporting water in the handle above the normal level of the water in the bowl and to provide convenient means for detachably securing the legs of the handle in the sockets of the bowl.

Other objects and features of the invention will be more apparent as the present disclosure proceeds and upon consideration of the accompanying drawing and the following detailed description wherein an exemplary embodiment of the invention is disclosed.

In the drawing:

Fig. 1 in the left hand portion is a plan view of an aquarium exhibiting the invention while the right hand portion is a sectional view taken on the line 1—1 of Fig. 2.

Fig. 2 in the left hand portion is a side elevational view and the right hand portion is a section taken on the line 2—2 of Fig. 1.

Fig. 3 is a side elevational view of one of the clip elements for retaining the tubular handle in the sockets of the bowl.

This invention is directed to an aquarium wherein the mouth of the bowl is open and of a sufficiently large cross sectional area that atmospheric pressure acting on the surface of the water in the bowl provides a force greater than that necessary to maintain water in the arched hollow handle and accordingly above the level of the water in the fish bowl. An aquarium of this type is disclosed in the Rice Patent 2,512,678 and the invention herein disclosed pertains to an aquarium wherein the handle is formed as a separate element and maintained in cooperative relationship with the bowl.

Referring to the drawing, there is shown at 10 a bowl which may be formed of transparent material such as glass and forms one unit of the aquarium. A relatively large flat base 11 is provided at the bottom of the bowl so that the aquarium will stand upright on any generally horizontal supporting surface. The bowl is substantially circular in its lowermost portion and provided with concave outer surface 12 and a convex inner wall surface. An open mouth 14 is provided in the top of the bowl 10 and the mouth is for the purpose of filling the bowl with water and is of such large cross sectional area as to permit atmospheric pressure to operate on the surface of the water which is maintained at approximately the level indicated at 16 in Fig. 2. A vertically arranged web or rib 17 is formed integral with the bowl structure and surrounds the opening in the top of this bowl. The web 17 is of elliptical formation as shown in Fig. 1. A flange 18 may be provided around the perimeter of the web 17 to improve the ornamental appearance of the bowl and to add strength to the upper portion of the bowl structure.

It will be observed from a consideration of Fig. 1 that relatively large and substantially horizontal portions 19 and 21 are provided on the upper wall surface of the bowl 10 at opposite sides of the elliptical shaped opening 14. These areas 19 and 21 provide space for accommodating a vertical opening 23 in the bowl for communication with the interior of a tubular handle 31 as hereinafter described. The web 17 is arcuate shaped adjacent the opening 23 to form a socket 24 which is integral with the web 17, as will be apparent from consideration of Fig. 1. The socket 24 is of such circumferential extent as to embrace a major portion of a leg of the handle 31. A similar socket 26 is provided at the opposite side of the bowl and the lower open end 27 is in communication with the interior of the bowl 10 below the water level 16. The socket 26 is formed integral with the rib 17 and embraces a major portion of another leg of the handle.

The handle 31 is of hollow tubular formation and formed of transparent material such as glass. The upper portion 32 of the handle is of hemi-circular shape and the depending legs 33 and 34 are integral with the arcuate portion. The handle is accordingly of inverted U-shape and the depending leg portions 33 and 34 are substantially straight and parallel with respect to each other in the portions below the tops of the sockets 24 and 26. The outside diameter of the handle 31 and particularly the depending legs 33 and 34 is of such dimensions as to fit snugly within the sockets 24 and 26. The lower end of the leg 33 is preferably angular or arcuate shaped as indicated at 36 so as to conform in general to the contour of an adjacent portion of the wall of the bowl 10. The lower end of the leg 34 is similarly shaped as indicated at 37.

It will be appreciated that the bowl may be formed as one element of the aquarium and that the handle may be formed as a separate element. The handle 31 may be readily mounted on the bowl by introducing the legs 33 and 34 in the respective sockets. The aquarium may be filled by introducing water through the open mouth 14. The water may be caused to rise and fill the hollow tubular handle 31 by withdrawing air from the interior of the handle in the zone indicated at 41. The bowl and handle may also be submerged and the aquarium arranged on one side with the handle 31 in a generally horizontal position. The water then flows into one leg of the handle to push the air from the other leg. The atmospheric pressure acting on the surface of the water through the open mouth 14 provides a force sufficient to support the water in the handle 31 and maintain the handle filled with water. The fish may swim in the bowl and swim through the hollow handle.

If it is desired the handle 31 may be more securely maintained in the sockets 24 and 26 by suitable means such as clips, one of which is shown in Fig. 3. Each clip or clasp may be formed of wire or the like having resilient characteristics. Each clip includes side members 51 and 52 which are substantially parallel. The end portions 54 and 56 are bowed inwardly in the normal position thereof as shown in Fig. 3. A lug 57 is formed integral with the handle 31 on the lower end of each leg as shown in Fig. 2. A lug 59 is provided on the socket 24 below the flange 18. A similar lug 61 is provided on the socket 26. The clip as shown in Fig. 3 is of such lengthwise dimensions that the end portions 54 and 56 may be snapped over the lugs 57 and 59 and similar end portions of another clip may be forced over the lugs 57 and 61 to thereby detachably secure the handle in position with the legs 33 and 34 in the sockets and prevent inadvertent detachment of the handle from the bowl.

While the invention has been described with regard to specific structural features of the handle and the bowl sockets and with regard to one type of fastening element it will be understood that changes may be made in the parts as well as the general organization. Such modifications and others may be made without departing from the spirit and scope of the invention as set forth in the appended claims.

What I claim and desire to secure by Letters Patent is:

1. In an aquarium, a bowl having an elliptical shaped open mouth in the top thereof, a vertically disposed web integral with the bowl and surrounding said mouth, a generally horizontal top wall area on the bowl at opposite sides of the elliptical shaped mouth, an arcuate portion integral with the web at one side of the mouth forming a socket above one of said top wall areas in open communication with the interior of the bowl, an arcuate portion integral with said web at the opposite side of the mouth forming a second socket above the other top wall area in open communication with the interior of the bowl, an inverted U-shaped tube having depending legs extending into said sockets, and the lower ends of said legs terminating below the top of said web.

2. In an aquarium, a bowl having an open mouth in the top thereof, a vertically disposed web integral with the bowl and surrounding said mouth, an arcuate portion integral with the web at one side of the mouth forming a socket in open communication with the interior of the bowl, an arcuate portion integral with the web at the opposite side of the mouth forming a second socket in open communication with the interior of the bowl, an inverted U-shaped tube having depending legs extending into said sockets, a lug carried by each leg of the tube, a lug carried by each arcuate portion, a resilient clip engaging a lug on the tube and a lug on said arcuate portion to detachably retain the legs of the tube in said sockets, and the lower ends of said legs terminating below the top of said web.

3. In an aquarium, a bowl having an elliptical shaped open mouth in the top thereof, a vertically disposed web integral with the bowl and surrounding said mouth, a generally horizontal top wall area on the bowl at opposite sides of the elliptical shaped mouth, an arcuate portion integral with the web at one side of the mouth forming a socket above one of said top wall areas in open communication with the interior of the bowl, an arcuate portion integral with said web at the opposite side of the mouth forming a second socket above the other top wall area in open communication with the interior of the bowl, an inverted U-shaped tube having depending legs extending into said sockets, the lower ends of said legs terminating below the top of said web, and means detachably securing the legs of the tube within said arcuate portions.

EARL A. RICE.

References Cited in the file of this patent
UNITED STATES PATENTS

| Number | Name | Date |
|---|---|---|
| D. 84,002 | Smith | Apr. 21, 1931 |
| D. 160,125 | Rice | Sept. 12, 1950 |
| 192,595 | Palen et al. | July 3, 1877 |
| 1,576,462 | Polzin | Mar. 9, 1926 |
| 1,943,417 | Bringman | Jan. 16, 1934 |
| 2,059,927 | Beck | Nov. 3, 1936 |
| 2,512,678 | Rice | June 27, 1950 |